United States Patent [19]

Trosper et al.

[11] Patent Number: 4,980,948
[45] Date of Patent: Jan. 1, 1991

[54] HIDE PULLING APPARATUS AND METHOD

[75] Inventors: Thomas R. Trosper; Robert G. Barnum, both of Sergeant Bluff, Iowa; Kenneth D. Kropf, South Sioux City, Nebr.

[73] Assignee: IBP, Inc., Dakota City, Nebr.

[21] Appl. No.: 457,181

[22] Filed: Dec. 26, 1989

[51] Int. Cl.$^5$ .............................................. A22B 5/16
[52] U.S. Cl. .......................................... 452/86; 452/82
[58] Field of Search ............................ 17/21, 50, 23

[56] References Cited

U.S. PATENT DOCUMENTS

| | | | |
|---|---|---|---|
| 3,165,781 | 1/1965 | Slotkin | 17/50 |
| 3,936,908 | 2/1976 | Cook | 17/21 |
| 4,164,056 | 8/1979 | Hilgner et al. | 17/21 |
| 4,653,149 | 3/1987 | Swilley | 17/21 |

*Primary Examiner*—Willis Little
*Attorney, Agent, or Firm*—Beveridge, DeGrandi & Weilacher

[57] ABSTRACT

A hide is pulled from the sides of a suspended livestock carcass by gripping the hide with two grippers in the belly area, and pulling the grippers and the hide toward the back of the carcass. The pulling direction is changed by supporting the pulling devices on transversely movable carriages which are moved toward each other during the pulling action. The transverse movement enables the grippers initially to reach farther around the belly to grip the hide, and finally to pull farther toward the spine.

10 Claims, 2 Drawing Sheets

HIDE PULLING APPARATUS AND METHOD

BACKGROUND OF THE INVENTION

This invention relates to a method and apparatus for pulling hides from animal carcasses. In particular, it relates to a type of hide pulling machine known in the industry as a "sidepuller" because it pulls the hide from the sides of suspended carcasses of beef or other livestock animals.

It has been customary in the beef industry to perform a substantial amount of manual skinning in the belly area in preparation for a sidepulling operation. Such manual skinning, performed with conventional and power knives, was considered to be necessary due to the tenacity of to the hide to the carcass adjacent to the abdominal opening, and to provide a flap which was sufficientlY long to reach laterally outwardly to a position where it could be engaged by the jaws of the grippers of the sidepuller machine.

The present invention is concerned with a method and apparatus which reduces the extent of manual skinning required prior to the operation of the sidepuller machine. This is possible due to the way in which the pulling means of the machine is supported and moved when the hide is being pulled from the sides of the carcass. As a result of the present invention, the manual labor required in the skinning operation is substantially reduced, and the amount of skinning performed by the sidepuller machine is increased, thus adding to the efficiency of the operation of the facility where the method and apparatus are used.

SUMMARY OF THE INVENTION

The invention represents an improvement in a known type of apparatus which pulls the hide from a suspended livestock animal carcass. In a known manner, the apparatus has two grippers arranged for gripping the hide on opposite sides of the animal's belly, two pulling means for pulling the grippers and a hide gripped thereby in pulling directions that extend from the belly toward the back of the carcass, and support members which support the two pulling means. The improvement according to this invention involves the provision of moving means for moving the support members laterally with respect to the pulling direction. The pulling means and the moving means operate simultaneously when the hide is being pulled from the carcass.

Preferably, the moving means are operable to move the support members toward each other in an arcuate path when the grippers are moving in the pulling direction. The gripper jaws extend toward each other and toward the belly of the carcass, and these jaws are positioned between the longitudinal axes of the pulling means. A back supporting means is normally provided for engaging and pushing the back of the carcass during the hide pulling operation. The apparatus preferably includes a main frame which moves parallel to the path of the carcasses. A vertically movable frame is mounted on the main frame and it carries the grippers, the pulling means, and the moving means.

The invention also involves a hide pulling method in which the hide-engaging gripper means are pulled toward a pair of spaced apart points, and these points are moved toward each other during the pulling step.

The invention may be performed by a wide variety of machines, only one of which is disclosed in this specification.

DETAILED DESCRIPTION

Figure 1:
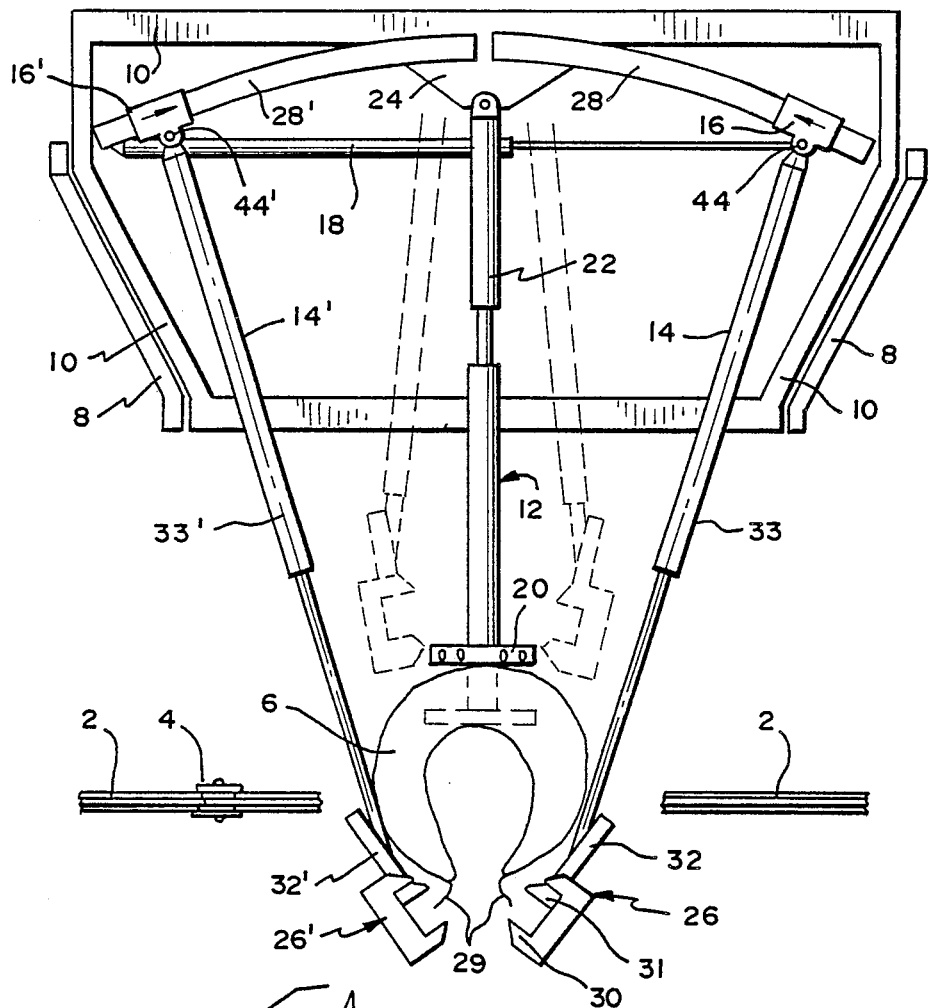
FIG. 1 is a diagrammatic plan view showing the principal components of the apparatus at the beginning and at the end of a sidepulling operation.

The invention is normally used in connection with power driven trolleys which ride on a main rail and carry suspended beef carcasses. A rail 2 and trolley 4 are shown in a very abbreviated form in FIG. 1, and they carry carcasses such as the carcass designated 6.

The improved sidepuller includes a main frame 8 which moves parallel to the beef rail 2 so that the sidepuller will travel in the same direction and velocity as the moving carcasses. A vertically movable frame 10 is supported by the main frame 8, and it carries a back support means 12, pulling means 14 and 14', carriages 16 and 16' which serve as support members, and moving means 18 and 18' which move the carriages laterally as will be described later in this specification.

The back support means 12 includes a backrest 20 which engages the back of the carcass during the hide pulling operation. It can be forced against the carcass by means of a hydraulic cylinder 22 which is mounted on a plate 24 attached to the frame 10.

The hide-engaging grippers 26 and 26' are mounted on hydraulic cylinders 14 and 14' which act as the pulling means. The grippers 26 and 26' are used to grip the hide on opposite sides of the belly. Small hide flaps are shown at 29. Each gripper includes a fixed jaw 30 and a movable jaw 31 which is actuated by a cylinder 32 in order to move the movable jaw from its open position to its closed hide-gripping position. The grippers 26 and 26' are mounted on the rods of the hydraulic cylinders 14 and 14' to pull the grippers and a hide gripped thereby in pulling directions that extend from the belly toward the back of the carcass. The cylinders have longitudinal axes 33 and 33', and the jaws of the grippers 26 and 26' are positioned between these longitudinal axes so that the respective grippers extend toward each other and toward the belly of the carcass for convenience in gaining access to the flaps 29.

Figure 2:
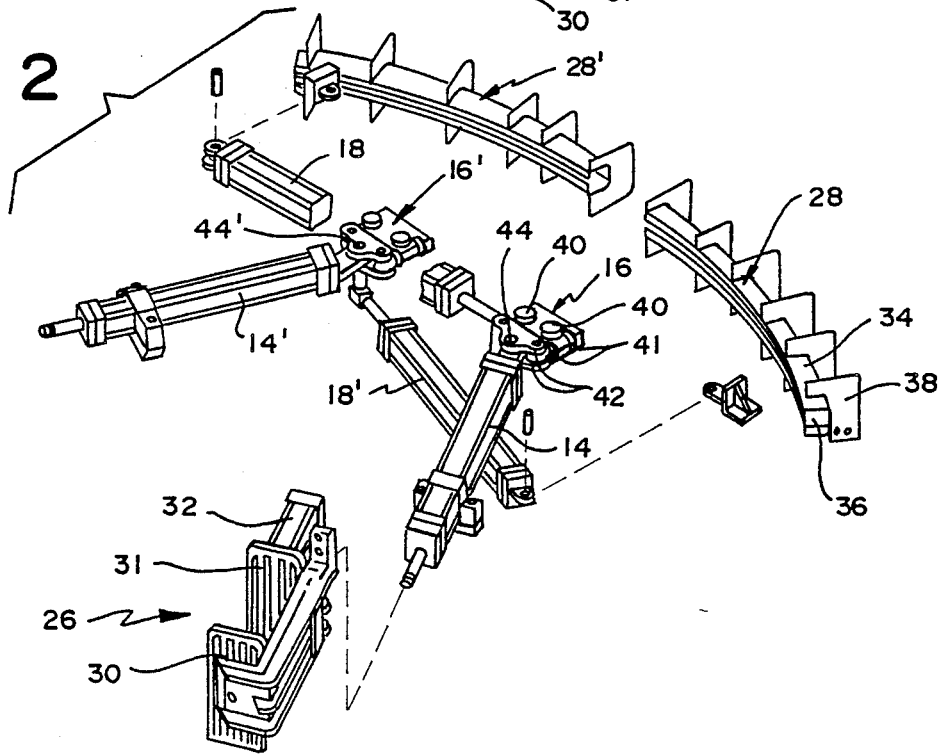
FIG. 2 is an exploded perspective view of some of the main components of the apparatus.

Cylinders 14 and 14' are supported at the rear of the frame 10 by carriages 16 and 16' which are movable in arcuate tracks 28 and 28'. Such movement is produced by a pair of transversely oriented cylinders. Only cylinder 18 is shown in FIG. 1 for illustrative purposes, but both cylinders 18 and 18' are shown in FIG. 2. These cylinders are the means for moving the pulling cylinders 14 and 14' toward each other in an arcuate path which is lateral with respect to the hide pulling direction.

The track is formed in two sections 28 and 28', each section being associated with one of the carriages 16 and 16'. As shown in FIG. 2, the track 28 is formed of an upper channel 34 and a lower channel 36 which are connected together by a plurality of stiffeners 38. The carriage is a plate which carries eight wheels. Each carriage has two upper wheels 40, and each of these wheels has a diameter slightly less than the internal flange-to-flange distance of the upper channel 34. Two corresponding bottom wheels are provided on the carriage 16 to ride similarly in the lower channel 36. Each carriage 16 and 16' also has four small wheels 41 which ride on the edges of the webs of the channels 34 and 36.

Connector plates 42 are mounted on the forward portions of the carriages, and vertical pivot pins 44 and 44' pass through these connector plates to connect the carriages 16 and 16' to the pulling cylinders 14 and 14', and to the carriage-moving cylinders 18 and 18'.

Figure 3:
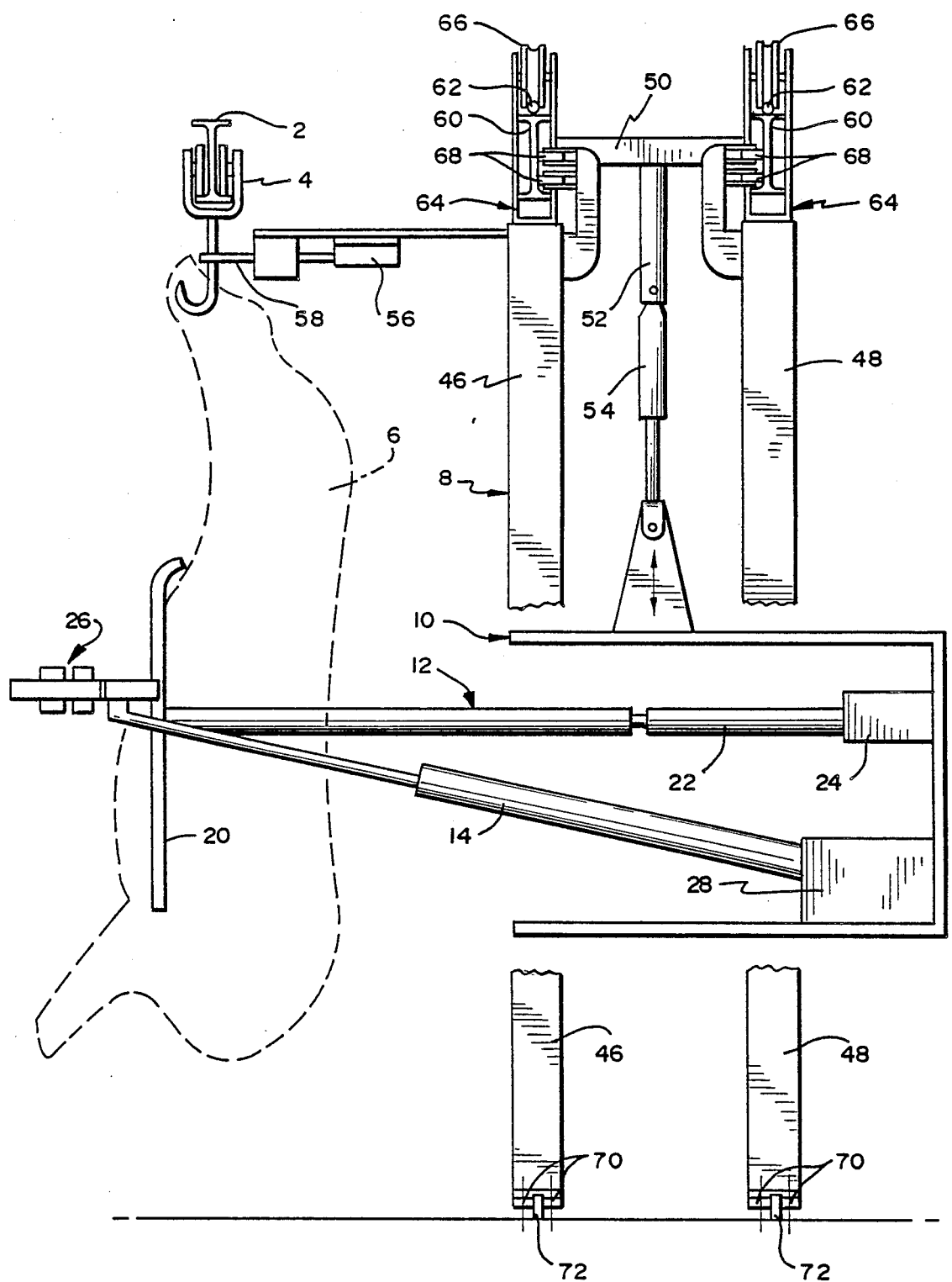
FIG. 3 is an elevational view of the apparatus, looking in the direction of carcass travel.

Additional details of the apparatus can be seen in FIG. 3 where the members 46, 48, 50 and 52 of the main frame 8 can be seen. The frame 10 is vertically movable by a cylinder 54 which is connected to the member 50 of the main frame so that the grippers 26 and 26' may be adjusted to a height suitable to the respective carcass. The main frame 8 is movable in the machine direction by the chain on the beef rail 2. A cylinder 56 on the frame 8 is actuated to extend an indexing pin 58 into the path of a trolley on the beef rail. Two longitudinally spaced indexing pins are preferably used. The main frame is supported on a pair of I-beams 60 which have elongated rods 62 of circular cross section welded to their upper flanges. The main frame 8 includes hanger assemblies 64 provided with rollers 66 with radiused grooves which correspond to the cross sections of the rods 62. To resist lateral forces encountered during operation of the apparatus, the frame 8 has rollers 68 which ride on the mutually facing inboard surfaces of the webs of the I-beams 60. At the lower end of the main frame 8, pairs of rollers 70 are arranged to ride on opposite surfaces of vertical rail members 72 which are anchored to the floor.

An operational cycle of the apparatus commences when the indexing pins 58 are extended into the paths of trolleys 4 so that the main frame 8 starts moving concurrently with a carcass 6. If necessary, the frame 10 is moved vertically by cylinder 54 to locate the grippers 26 and 26' at a suitable height for the carcass or carcasses being handled. The backrest 20 is in contact with the back of the carcass. The operator places the hide flaps 29 between the jaws of the two grippers 26 and 26', and actuates the cylinders 32 and 32' to close the grippers. Then, the backrest cylinder 22, the pulling cylinders 14 and 14' and the carriage-moving cylinders 18 and 18' are actuated simultaneously so that the grippers 26 and 26' and the hide gripped thereby are pulled from the belly toward the back of the animal. The backrest moves to the position shown in broken lines in FIG. 1. Due to the action of the carriage-moving cylinders 18 and 18', the angulation of the hide pulling cylinders 14 and 14' changes during the pulling movement. The pull is directed toward points established by the pivot pins 44 and 44', and these points move toward each other during the pulling action.

Although one embodiment of the invention has been shown and described in this specification. Persons who are familiar with the art will realize that it is capable of taking many forms. Therefore, it is emphasized that the invention is not limited solely to the disclosed embodiment but is embracing of modifications and variations thereof which fall within the spirit of the following claims.

We claim:

1. Apparatus for pulling the hide from a suspended carcass of a livestock animal, said carcass having a back and a belly, said apparatus comprising,
   two grippers for gripping the hide on opposite sides of the belly,
   two pulling means for pulling the grippers and a hide gripped thereby in pulling directions that extend from the belly toward the back of the carcass,
   two support members for supporting said two pulling means,
   moving means for moving said support members in directions which are lateral with respect to the pulling direction,
   said pulling means and said moving means being operable simultaneously when the hide is being pulled from the carcass.

2. Apparatus according to claim 1 wherein said moving means moves the support members toward each other when the grippers are moving in said pulling directions.

3. Apparatus according to claim 1 wherein said moving means moves said support members in an arcuate path.

4. Apparatus according to claim 1 wherein each of said pulling means has a longitudinal axis, said grippers having jaws positioned between said longitudinal axes of the pulling means so as to extend toward each other and toward the belly of the carcass.

5. Apparatus according to claim 1 having a vertically movable frame, said moving means and said pulling means being mounted on said vertically movable frame.

6. Apparatus according to claim 1 having a carcass support means which is movable in a horizontal path, said apparatus being supported by a main frame which moves in a direction which is substantially parallel to said horizontal path of the carcass support means.

7. Apparatus according to claim 1 having back support means for engaging the back of the carcass when the hide is being pulled from the carcass.

8. A method for pulling the hide from a suspended carcass of a livestock animal, said carcass having a back and a belly, said method including the steps of, gripping the hide with grippers which are located on opposite sides of the belly and are supported from spaced apart support points which are on opposite sides of the back,
   pulling the grippers and a hide gripped thereby in pulling directions that extend from the belly toward the back of the carcass, said pulling direction for said grippers extending toward spaced apart support points, and
   moving said support points toward each other during said pulling step.

9. A method according to claim 8 wherein said points are moved toward each other in an arcuate path.

10. A method according to claim 8 including the step of engaging and pressing against the back of the carcass when the hide is being pulled from the carcass.

* * * * *